US012162727B2

(12) United States Patent
Butler et al.

(10) Patent No.: US 12,162,727 B2
(45) Date of Patent: Dec. 10, 2024

(54) RAIL STABILIZING SAFETY BRAKE

(71) Applicant: Inventio AG, Hergiswil (CH)

(72) Inventors: Erich Butler, Ebikon (CH); Alessandro D'Apice, Ebikon (CH); Romeo Lo Jacono, Gravesano (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/246,341

(22) PCT Filed: Sep. 24, 2021

(86) PCT No.: PCT/EP2021/076309
§ 371 (c)(1),
(2) Date: Mar. 23, 2023

(87) PCT Pub. No.: WO2022/069355
PCT Pub. Date: Apr. 7, 2022

(65) Prior Publication Data

US 2023/0356978 A1 Nov. 9, 2023

(30) Foreign Application Priority Data

Oct. 1, 2020 (EP) .................................... 20199630

(51) Int. Cl.
*B66B 5/22* (2006.01)
*B66B 7/02* (2006.01)

(52) U.S. Cl.
CPC ................ *B66B 5/22* (2013.01); *B66B 7/022* (2013.01)

(58) Field of Classification Search
CPC .............. B66B 7/022; B66B 5/22; B66B 5/20
See application file for complete search history.

(56) References Cited

U.S. PATENT DOCUMENTS 3,220,510 A 11/1965 Morris
3,249,179 A 5/1966 Borgman

FOREIGN PATENT DOCUMENTS

DE 1406188 A1 11/1968
EP 0841280 A1 5/1998
WO 2020127787 A1 12/2018

*Primary Examiner* — Diem M Tran
(74) *Attorney, Agent, or Firm* — William J. Clemens; Shumaker, Loop & Kendrick, LLP

(57) ABSTRACT

A safety brake for a traveling body in an elevator system brakes against a brake rail oriented in a traveling direction. The safety brake includes a housing with a catch element and a brake pad attached to the housing opposite one another. The catch element is mounted on the housing such that an application movement of the catch element relative to the housing is possible, and the application movement reduces an opening width between the brake pad and the catch element. At least the catch element or the brake pad has a notch for fitting around a protrusion of a brake rail during braking. The opening width corresponds to at least twice the depth of the notch.

17 Claims, 5 Drawing Sheets

RAIL STABILIZING SAFETY BRAKE

FIELD

The present invention relates to a safety brake, a traveling body, and an elevator system.

BACKGROUND

In an elevator system, an elevator car is typically moved vertically along a travel path between different floors or levels within a structure. At least in tall buildings, an elevator type is usually used in which the elevator car is held by rope or belt-like suspension elements and displaced within an elevator shaft by moving the suspension elements by means of a drive machine. In order to at least partially compensate for the load of the elevator car to be moved by the drive machine, a counterweight is usually attached to an opposite end of the suspension elements. This counterweight typically has a mass which corresponds to the elevator car, including an average load. Depending on the type of elevator, multiple counterweights and/or multiple elevator cars can also be provided in an elevator system. Both elevator cars and counterweights are referred to as traveling bodies. The traveling bodies move along guide rails on which the traveling bodies are guided over guide shoes.

EP 18214771A (WO 2020/127787 A1), the description of which is to be considered part of this application, is intended to describe a guide rail with guide contours. The guide contours, designated as springs in EP18214771A, are referred to as protrusions in the context of this description. Such guide rails are typically produced from sheet metal.

Guide rails take on the function of guiding the traveling bodies in elevator systems. Typically, guide rails also serve as brake rails, in that at least parts of the guide rail interact with a brake in such a way that a braking force is produced for braking the traveling body.

Conventional safety brakes often brake on the guide rails, which can therefore also be referred to as brake rails. For example, EP0841280A1 shows a safety brake with a catch roller. The safety brakes cause very large contact pressures on the brake rails. Without further measures, these contact pressures are too great for rails comprising thin webs, as can be the case in particular with rails made of sheet metal. The use of guide rails with thin webs is therefore limited since, at the very least, elevator cars should always have safety brakes for safety reasons.

SUMMARY

There can now be considered a need for an elevator system which eliminates the disadvantages shown.

According to a first aspect of the invention, the object is achieved by an elevator system. The elevator system comprises a brake rail, a traveling body with a safety brake for braking against a brake rail of the elevator system, the brake rail being oriented in a traveling direction. The safety brake comprises a housing, a catch element, and a brake pad. The brake pad and the catch element are attached to the housing opposite one another. The catch element is mounted on the housing such that an application movement of the catch element relative to the housing is possible, and this application movement reduces an opening width between the brake pad and the catch element. At least the catch element or the brake pad has a notch for fitting around a first protrusion or a second protrusion of a brake rail during braking. The brake rail comprises the first protrusion and/or the second protrusion. The first protrusion engages in the notch in the brake pad at least during the braking process and/or the second protrusion engages in the notch in the catch element at least during the braking process. The opening width of the safety brake corresponds to at least twice the depth of the notch.

Possible features and advantages of embodiments of the invention can be considered, inter alia and without limiting the invention, to be based upon the concepts and findings described below.

Brake rails may comprise multiple regions which serve different functions, such as guiding guide shoes, fastening in the shaft or braking the traveling bodies. The brake rail has at least one protrusion, around which the notch fits. In the extension of an application direction, that is to say of the direction of the application movement, a web of the brake rail extends away from the protrusion. The web is designed to absorb the contact pressure exerted on the protrusion. Preferably, the web extends between two protrusions of the brake rail. In this case, it usually forms a rectilinear connection of the two protrusions. As a result, the contact pressure on the two protrusions is absorbed substantially as a pressure force in the web. A thickness of the web is smaller than the opening width of the safety brake. A web can be made of thin material, i.e., a material with a small thickness, such as sheet metal.

As already noted in the introduction, conventional counterweights have disadvantages when used on thin webs. In particular, there is the possibility that the web can bulge and/or buckle under the pressure load. This would greatly reduce the contact pressure and with it the braking force at the protrusions. The safety brake now allows braking on a web, the thickness of which is much smaller than the distance between the catch element and the brake pad, that is to say on a thin web. In this case, the web has in each case a protrusion at two opposite ends. This protrusion can preferably be configured as a continuation of the web or lift off from the web by means of a structural transition, such as, for example, by widening or tapering. The substantially flat brake linings and catch elements of conventional safety brakes would slip off the web and the web could bulge or buckle under the load of the catch elements.

By using a brake pad which has a notch or a catch element having a notch, the safety brake can orient itself along the brake rail as soon as the safety brake begins to brake. The notch engages the web by the notch receiving the protrusion on the web and preventing the web from being able to slip off the brake pad or off the catch element in which the notch is located. The notch positions the safety brake relative to the brake rail. The position of the protrusion in the notch is thus defined. However, without further measures, the safety brake could still rotate about an axis in the notch. This rotation is preferably prevented. For example, the safety brake can be fixedly connected to the traveling body. The traveling body is preferably guided by means of further guide shoes of the traveling body or further notches of a further safety brake such that a rotation of the traveling body and thus also of the safety brake is prevented.

The housing of the safety brake serves to frictionally connect the brake pad and the catch element. The contact forces applied in the case of braking are transmitted by the housing from the brake pad to the catch elements. In addition, the housing serves to fasten the safety brake to the traveling body in that the housing has, for example, elongated holes, round holes or fastening bolts.

The catch element is guided on the housing via a guide. This allows a relative movement between the housing and the catch element. In this case, the relative movement leads from a rest position, in which the catch element is spaced apart from the brake rail, to a braking position, in which the catch element presses against the brake rail with a contact pressure. After a first contact of the catch element with the brake rail, the resulting frictional force leads to further application of the brake element to the brake rail. This further application can be limited by an end stop. The frictional force, after being applied, then acts on the traveling body as a braking force.

The brake pad is arranged on the side of the web of the brake rail opposite the catch element. The brake pad serves the contact force, which is applied by the catch element, as an abutment. The brake pad is designed to generate frictional forces under the applied contact pressure which serve to stop or hold the traveling body.

The brake pad can also be designed in the form of a further movable catch element. Both catch elements can be easily retracted along their guide. The release force required in this case is significantly less than when a safety brake with a brake pad is released, wherein the brake pad is moved relative to the brake rail under great contact pressure. This leads to a simpler releasing of the safety brake after a catch.

The opening width preferably corresponds to at least five times or, even better, to ten times the depth of the notch. The part of the brake rail between the first protrusion and the second protrusion is preferably flat in shape.

According to a preferred embodiment, the notch is oriented along a direction of travel, wherein the direction of travel is oriented perpendicular to the direction of the opening width.

Regardless of whether the notch on the catch element or the brake pad, the notch is aligned along the direction of travel of the traveling body. It thus extends in the same direction as the brake rail. This is typically a vertical orientation since the traveling body in an elevator system typically moves upward and downward.

According to a preferred embodiment, both the catch element and the brake pad have a notch.

By using a brake pad which has a notch, and a catch element which has a notch, the safety brake can be guided more reliably along the brake rail. As soon as the safety brake is held by the two notches, the brake rail is securely guided. The notches engage the web in that the notches receive the protrusions on the web and prevent the web from slipping off the brake pad or the catch element. Because both the brake pad and the catch element have notches, the safety brake is positioned correctly, and additionally the rotational orientation of the safety brake is also defined. As a result, the guide shoes of the elevator system are relieved during safety braking.

It is advantageous that a notch is so deep that it prevents the web from slipping away, and that the notch also prevents a local rotation of the protrusion, that is to say of one of the ends of the web. Due to this changed constraint, the bulging or buckling load of the web is increased many times over since the protrusion is both located in a defined position in the notch and held precisely in the correct orientation, i.e., held parallel to the web. A depth sufficient for this purpose corresponds to at least twice the opening width of the notch. The opening width of the notch is that width of the notch which is measured along the surface of the catch element or of the brake pad.

According to an alternative embodiment, the catch element is designed as a catch wedge.

The notch is preferably oriented parallel to the direction of travel. According to a preferred embodiment, the catch element is designed as a catch roller, and in particular the notch runs circumferentially on the circumference of the catch roller.

The notch thus always has a point at which the circumferential notch is oriented parallel to the direction of travel. This is also the point that contacts the protrusion of the brake rail if the catch element is applied to the brake rail. The catch roller can therefore be attached in any orientation, and a part of the notch is always correctly aligned.

According to a first alternative embodiment of the brake pad, the brake pad is fixedly attached to the housing.

In particular, the housing can provide a recess into which the brake pad can be inserted and optionally fastened. Such a fastening minimizes the cost of manufacture and is therefore cost-effective.

According to a second alternative and preferred embodiment of the brake pad, a contact pressure on the brake pad is limited by a tensioning body under pretension.

A limitation of the contact pressure can preferably be achieved in that a tensioning body is pressed under pretension in the direction of the brake rail, and the brake pad can be pressed back by the brake rail when a desired contact pressure is reached, and the contact pressure can thereby be kept substantially constant. Preferably, disk springs are provided as tensioning bodies, which press the brake pad or a mounting of the brake pad with a predefined contact pressure against a stop. As soon as a greater force than the predefined braking force is exerted on the brake pad by the brake rail, the brake pad detaches from the stop, and only a negligibly small increase in the contact pressure is possible within the framework of the spring stiffness of the disk springs. The brake pad thus has the possibility of drawing back if the contact pressure is too great. The limiting of the contact pressure thus also limits the braking force.

According to a preferred embodiment, the opening width of the notch tapers from the surface of the brake pad or the catch element towards the base of the notch.

In other words, the notch has a smaller width than on the surface and the decrease in the width preferably extends symmetrically and preferably continuously. Such a decrease in the width of the notch over the depth direction of the notch can be referred to as a tapering.

An advantage of the tapering is that the protrusion of the brake rail can engage securely in the notch. Preferably, the protrusion is shaped such that it has a taper corresponding to the taper of the notch. This means that the thinnest region of the protrusion, i.e., a tip, is inserted into the widest region of the notch during insertion. As a result, it can also be ensured with a rough positional tolerance between the protrusion and the notch that the protrusion can be inserted into the notch. The shape of the protrusion is particularly advantageously congruent to the shape of the notch.

According to a preferred embodiment, the width of the first and or of the second protrusion is respectively greater than the width on the base of the respectively associated notch of the brake pad or of the catch element.

The width of the protrusion describes any desired width of the protrusion, but in particular the width of the tip of the protrusion.

As a result, the protrusion does not reach the base of the notch, but rather previously projects on the slightly inclined flanks of the notch. The flanks are inclined at a small flank angle with respect to the effective direction of the contact pressure. As a result, the protrusion is additionally also clamped between the two flanks. As a result, the braking force effected at the protrusion, in particular the braking force caused by the brake pad, is increased.

A tapering notch interacts particularly advantageously with a protrusion, which likewise preferably tapers in the same way. A first advantage is that this ensures that the tapered end of the protrusion can be better inserted into the notch, as explained above. A second advantage is that the flank angle leads to the generated braking force increasing greatly, without the web of the brake rail being subjected to a greater compressive force. And thirdly, the mating forms of notch and protrusion result in the protrusion being held both in a correct position and also in the protrusion being oriented parallel to the desired position of the web, that is to say parallel to a connecting line between the two notches. This leads to a maximization of the bulging or buckling load of the web. The web is actually clamped on the protrusions (Euler's fourth buckling assumption), and not just hinged (Euler's second buckling assumption). This means that the reliability against bulging and buckling of the web can be further increased significantly by a pair of fittingly or congruently interlocking protrusions and notches.

According to a preferred embodiment, the housing of the safety brake has a contact region in order to prevent the brake rail from buckling under contact pressure.

Should the web nevertheless bulge due to excessive loading, the bulging is limited by the deformed metal sheet touching a contact region on the safety brake. This contact region counteracts further bulging. Buckling of the web is thereby prevented. In addition, the ability of the web to absorb contact pressures is also maintained. As a result, the contact pressures and thus also the braking forces remain so great that the traveling body can be braked and held. Therefore, in spite of the bulging brake rail, the safety brake continues to brake sufficiently strongly since the bulging of the brake rail is limited by the contact region. This ensures that the traveling body is held securely and does not crash.

According to a preferred embodiment of the elevator system, the brake rail is formed from sheet metal.

By means of the advantages of the safety brake shown above, it is possible to create an elevator system with a brake rail made of sheet metal. Such a brake rail made of sheet metal is cost-effective to produce. The brake rail can be constructed from multiple parts.

According to a preferred embodiment of the elevator system, the brake rail is shaped as a hollow profile. Such a hollow profile can be produced in particular by roll profiling or extrusion. Such a brake rail is light, particularly stable and inexpensive to manufacture.

According to an alternative embodiment of the elevator system, the brake rail is designed as a T-profile or a double-T profile.

However, the safety brake also allows the use on further brake rails if they comprise a web. Typical representatives of such brake rails can be T-profiles or double-T profiles. In this case, the protrusion can be used in the natural state, or preferably the profiles are machined, for example by milling or grinding, such that the protrusions taper and/or that the protrusions correspond to narrow tolerances of, for example, 1 mm.

According to a preferred embodiment, the traveling body is supported by a support device which triggers the safety gear when the load-bearing capacity is lost. The support device serves to connect the support means of the elevator system to the traveling body. The support device is therefore designed such that a voltage drop on the suspension means is detected.

In other words, the safety brake is thus activated via slack cable detection. Preferably, this has a mechanically design and is based on the fact that a spring is held in a tensioned position by the gravitational force of the traveling body. As soon as the gravitational force disappears, for example due to a free fall, the energy of the spring is guided to the catch element in such a way that it is displaced into the released state, that is to say to the brake rail.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
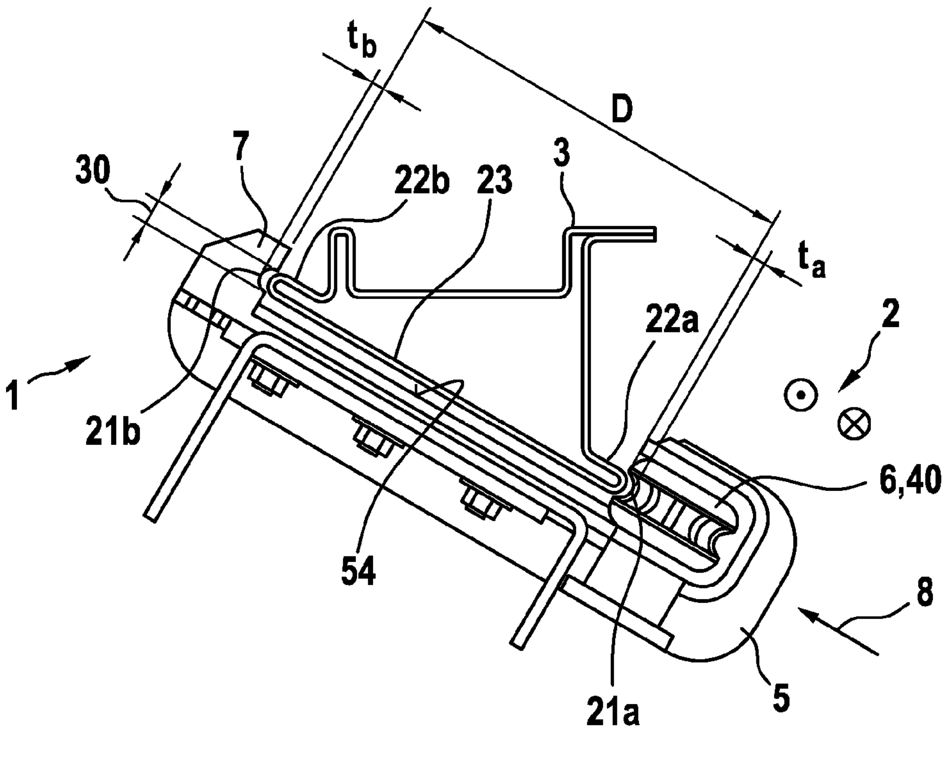
FIG. 1 shows a section of an embodiment of the safety brake.

FIG. 1 shows the safety brake 1 comprising a housing 5, a brake pad 7 and a catch element 6. The brake rail 3 is mounted between the brake pad 7 and the catch element 6. The brake rail 3 designed as a hollow rail has various regions for guiding or braking. The brake rail 3 has two protrusions **22*a* and 22*b*. The safety brake 1 is guided along the brake rail 3 in such a way that the protrusion 22*a* is aligned with a notch 21*a* in the catch element 6 and the protrusion 22*b* is aligned with a notch 21*b* in the brake pad 7. The opening width D of the safety brake is, in this case, minimally larger than the maximum distance between the two protrusions 22*a* and 22*b*, so that the safety brake 1 can be easily displaced over the brake rail 3 and installed. The two notches 21*a* and 21*b* each have a depth t ($t_a$ and $t_b$). The depth $t_a$ of the notch 21*a* on the catch element 6 is equal to the depth $t_b$ of the notch 21*b* on the brake pad 7. In the catch element 6 configured as a catch roller 40, the notch 21*a*** is configured circumferentially around the catch element.

During a journey, the safety brake 1 moves in the direction of travel 2, i.e., substantially up or down. If a safety braking is triggered, the catch roller 40 is displaced so that at least one component of the movement lies in the application direction 8. As a result, the notches **21*a* and 21*b* are pushed over the protrusions 22*a* and 22*b*. The notches 21*a* and 21*b* ensure that the brake rail 3 and the catch element 6 or the brake pad 7 remain correctly positioned and aligned. Thus, the brake rail 3 is prevented from slipping off the catch element 6 or the brake pad 7. The width 30 of the notches corresponds substantially to the thickness of the protrusions 22*a* and 22*b*. During braking, the safety brake 1 effects large forces on the brake rail 3. Without suitable measures, this could cause the brake rail 3 to bulge and to buckle under the load. In order to prevent this, the safety brake 1 has a contact region 54 which limits bulging of the brake rail 3**.

Figure 2:
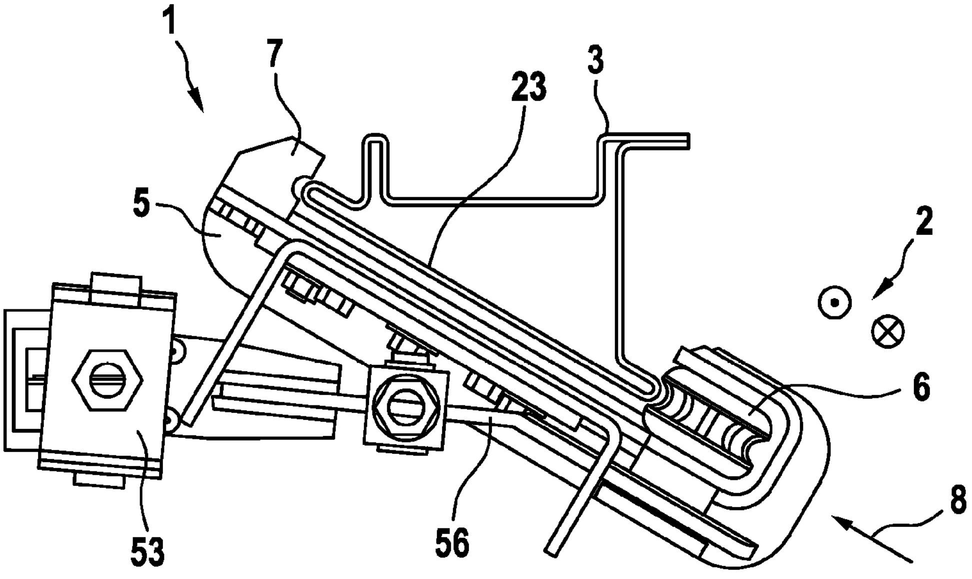
FIG. 2 shows a view from below of the same embodiment as in FIG. 1.

In comparison with FIG. 1, FIG. 2 additionally shows the support device 53 and the trigger lever 56.

Figure 3:
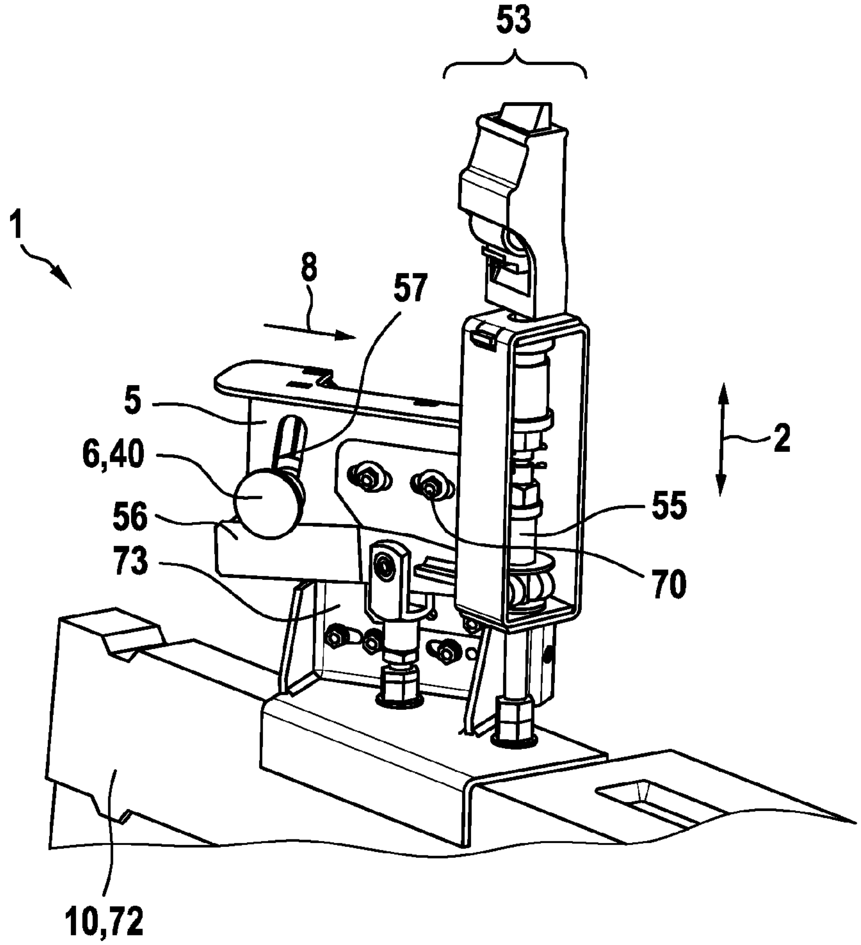
FIG. 3 shows an isometric view of the same embodiment as in FIGS. 1 and 2.

FIG. 3 shows a further isometric view of the same embodiment as in FIGS. 1 and 2. The safety brake 1 is shown in FIG. 3 together with further components of the elevator system. The guide shoe 73 is mounted on the traveling body 10, shown here as a counterweight 72. The support device 53 serves to support the traveling body 10. As soon as no more tensile load acts on the support device 53, the release spring 55 can expand. In this case, it causes a movement on the trigger lever 56 that moves the catch roller 40 along a connecting link 57 substantially upward. Since the connecting link 57 is slightly inclined relative to the direction of travel 2, this also leads to a movement component in the direction of the application direction 8. As soon as the catch roller 40 touches the brake rail (not shown in FIG. 3), it is displaced further upward and in the application direction 8 by the relative movement. With respect to the traveling body 10, the safety brake 1 has a floating mounting 70, which is realized via two elongated holes. This floating mounting allows the safety brake to easily move along the application direction.

Figure 4:
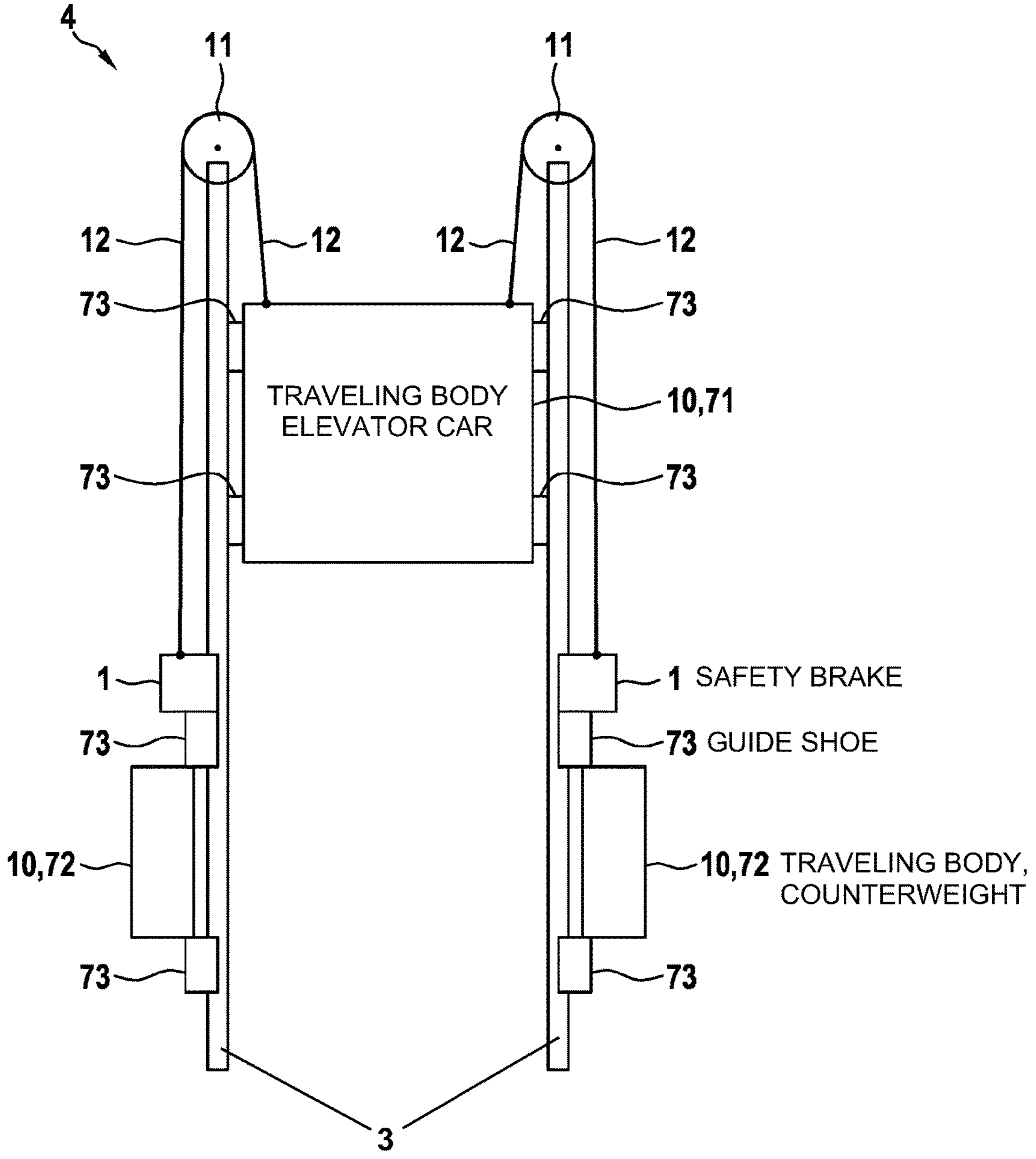
FIG. 4 shows an elevator system having a safety brake.

FIG. 4 shows an elevator system 4 having a safety brake 1. The elevator system has three traveling bodies 10, two counterweights 72 and an elevator car 71. A counterweight 72 is connected to a support means 12, which is connected to the elevator car 71 via a deflection roller 11 mounted at the top in the elevator system. The safety brake 1 is attached to the counterweights above the upper guide shoes 73 and is designed to brake on one of the two brake rails 3. The safety brake is designed to trigger if the support means 12 cracks and to prevent the counterweight 72 from crashing.

Figure 5:
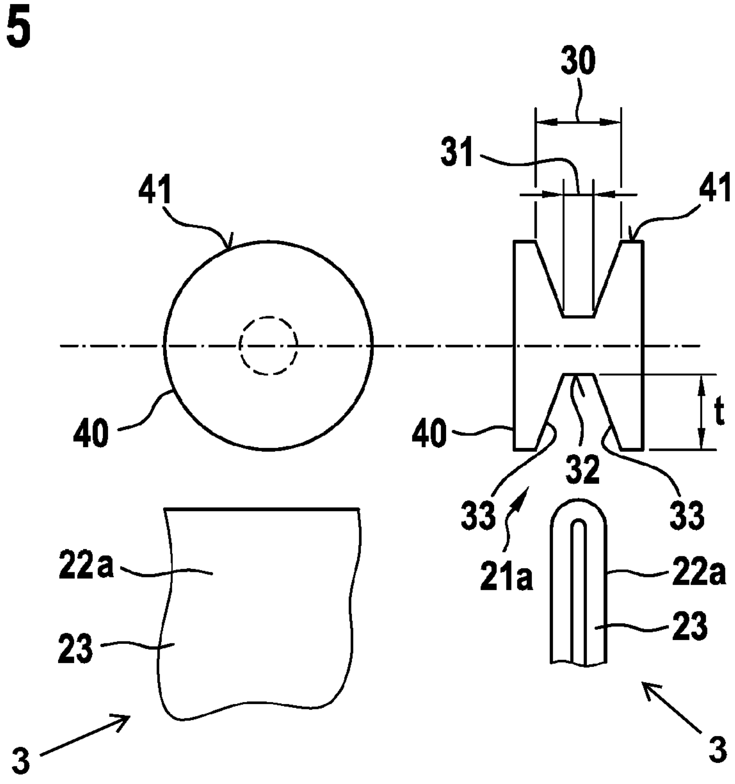
FIG. 5 shows an embodiment of a catch roller of the safety brake.

FIG. 5 shows an embodiment of a catch roller 40 of the safety brake 1. In addition, a part of the brake rail 3 is shown. FIG. 5 shows two views. The notch 21*a* extends over the entire circumference 41 of the catch roller 40. The protrusion 22*a* is an end region of the web 23, which adjoins the web 23 without transition. The shape of the protrusion 22*a* is not adapted to the shape of the notch, as a result of which a hinged constraint ensues for the web. This means that the protrusion can easily rotate in the notch. The contact surface between the catch roller 40 and the protrusion 22*a* is very small during safety braking. This embodiment could be further improved by adapting the notch to the shape of the protrusion.

Figure 6:
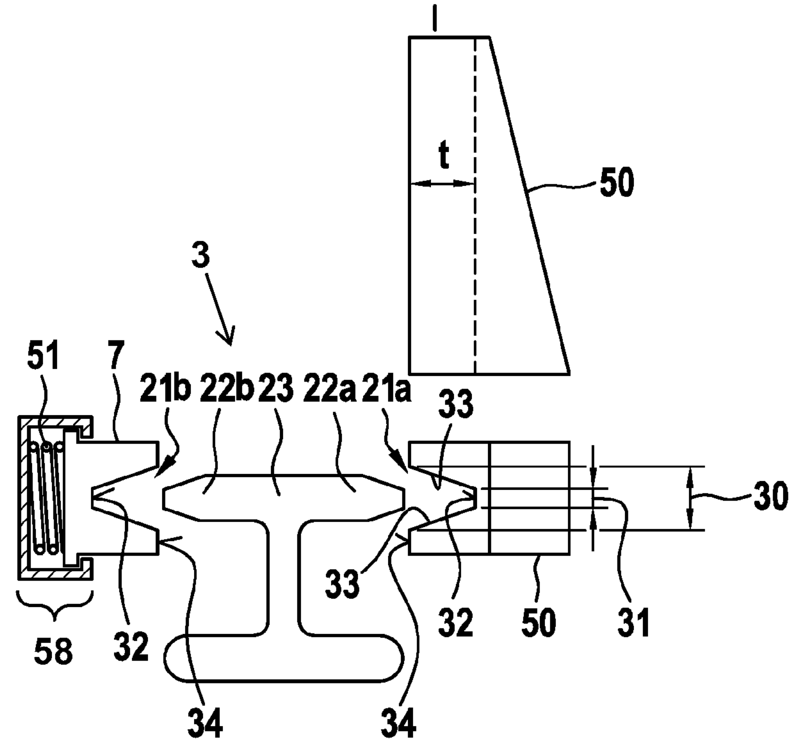
FIG. 6 shows an embodiment of a catch wedge of the safety brake.

FIG. 6 shows an embodiment of a catch wedge 50 of the safety brake 1 in two views. A brake rail 3 and a brake pad 7 are also shown in one of the two views. The notch 21*a* extends straight along the travel direction 2 along the catch wedge 50. The protrusion 22*a* is configured as a machined end region of the web 23, and a transition from the web 23 to the protrusion 22*a* is therefore discernible. The brake pad 7 also has a brake force limitation 58. As soon as the force acting on the brake pad 7 exceeds a predefined force to which a clamping means 51 is tensioned, the brake pad 7 is thus pushed away by the brake rail 3. In this case, the force on the clamping means 51 and thus on the brake rail 3 still increases slightly, but remains virtually constant.

Both in FIG. 5 and in FIG. 6, the notch 21*a* is preferably designed to taper. The notch 21*a* substantially comprises an opening width 30, a width 31 on the base 32 of the notch 21*a* and a depth t. The width 31 of the notch 21*a* on the base 32 is less than the opening width 30 at the surface 34. As a result, the protrusion 22*a* is pressed against the base 32 of the notch when the safety brake is triggered in the direction of the application direction, and the tapering notch 21*a* also clamps the protrusion 22*a* from both sides thereby increasing the braking effect. The angle of the flanks 33 is small in this case to the application direction of the catch element 6 is small in this case.

In FIG. 6, the shape of the protrusion 22*a* is also adapted to the shape of the notch 21*a*, as a result of which the clamped constraint ensues for the web 23 as soon as the safety braking is triggered. In other words, the protrusion is guided both in position and orientation in such a way that the protrusion is aligned along the desired position of the web. This greatly reduces the risk of the web bulging.

Finally, it should be noted that terms such as "having," "comprising," etc. do not preclude other elements or steps and terms such as "a" or "an" do not preclude a plurality. Furthermore, it should be noted that features or steps which have been described with reference to one of the above exemplary embodiments may also be used in combination with other features or steps of other exemplary embodiments described above. Reference signs in the claims should not be considered to be limiting.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system including a safety brake for braking against a brake rail oriented in a direction of travel of the elevator system, the safety brake comprising:
- a housing;
- a catch element;
- a brake pad;
- wherein the brake pad and the catch element are mounted opposite one another on the housing at an opening width that enables the safety brake to be displaced over the brake rail and to be moved along the brake rail in the direction of travel;
- wherein the catch element is mounted on the housing such that an application movement of the catch element relative to the housing reduces the opening width between the brake pad and the catch element;
- wherein the catch element and the brake pad each have a surface with a notch formed therein, each of the notches having an opening in the surface and a base spaced at a depth from the surface, the notches each adapted to fit around an associated protrusion of the brake rail during a braking operation of the safety brake; and
- wherein the associated protrusions of the brake rail are a first protrusion and a second protrusion, the first protrusion engaging in the notch beyond the surface of the brake pad during the braking operation, and the second protrusion engaging in the notch beyond the surface of the catch element during the braking operation.

2. The elevator system according to claim 1 wherein the notches are oriented along the direction of travel that is oriented perpendicular to a direction of the opening width.

3. The elevator system according to claim 1 wherein the notch in the brake pad is a first notch that tapers from the surface of the brake pad towards the base of the first notch and the notch in the catch element is a second notch that tapers from the surface of the catch element towards the base of the second notch.

4. The elevator system according to claim 1 wherein the catch element is a catch roller and the notch in the catch element extends circumferentially on a circumference of the catch roller.

5. The elevator system according to claim 1 wherein the catch element is a catch wedge.

6. The elevator system according to claim 1 wherein a contact pressure applied to the brake pad during the braking operation is limited by a tensioning body under pretension.

7. The elevator system according to claim 1 wherein the brake pad is fixedly attached to the housing.

8. The elevator system according to claim 1 wherein the brake rail is formed from sheet metal.

9. The elevator system according to claim 1 wherein the brake rail is shaped as a hollow profile.

10. The elevator system according to claim 1 wherein the brake rail is formed as a T-profile or a double-T profile.

11. The elevator system according to claim 1 including a traveling body supported by a support device wherein the support device triggers the safety brake to perform the braking operation when a load-bearing capacity of the support device is lost.

12. The elevator system according to claim 1 wherein a width of at least one of the first and second protrusions is greater than a width of the base of the associated notch.

13. The elevator system according to claim 1 wherein the housing has a contact region facing the brake rail that prevents the brake rail from buckling under contact pressure during the braking operation.

14. The elevator system according to claim 1 wherein the opening of at least one of the notches is least twice the depth of the at least one of the notches.

15. A safety brake for braking against a brake rail, the safety brake comprising:

a housing;

a catch element mounted on the housing;

a brake pad mounted on the housing opposite the catch element such that an application movement of the catch element relative to the housing reduces an opening width between the brake pad and the catch element;

wherein the catch element has a first notch formed therein, the first notch adapted to fit around a first protrusion of the brake rail during a braking operation of the safety brake;

wherein the brake pad has a second notch formed therein, the second notch adapted to fit around a second protrusion of the brake rail during the braking operation of the safety brake;

wherein the first protrusion engages in the first notch and the second protrusion engages in the second notch during the braking operation; and wherein the opening width between the brake pad and the catch element is at least five times a depth of one of the first and second notches.

16. The safety brake according to claim 15 wherein the opening width between the brake pad and the catch element is at least ten times a depth of one of the first and second notches.

17. An elevator system including a safety brake for braking against a brake rail oriented in a direction of travel of the elevator system, the elevator system comprising:

the brake rail having a pair of protrusions;

the safety brake having a housing, a catch element and a brake pad;

wherein the brake pad and the catch element are mounted opposite one another on the housing at an opening width that enables the safety brake to be displaced over the brake rail and to be moved along the brake rail in the direction of travel;

wherein the catch element is mounted on the housing such that an application movement of the catch element relative to the housing reduces the opening width between the brake pad and the catch element;

wherein the catch element and the brake pad each have a surface facing the brake rail with a notch formed therein, each of the notches having an opening in the surface and a base spaced at a depth from the surface, the notches each adapted to fit around an associated one of the protrusions of the brake rail during a braking operation of the safety brake; and wherein, during the braking operation, the protrusions of the brake rail engage in the notches beyond the surfaces of the brake pad and the catch element preventing local rotation of the protrusions.

* * * * *